United States Patent
Nösekabel et al.

(10) Patent No.: US 7,260,983 B2
(45) Date of Patent: Aug. 28, 2007

(54) METHOD AND AN APPARATUS FOR THE INSPECTION OF THE SURFACE OF A TIRE

(75) Inventors: Ernst-Heinrich Nösekabel, Rosenheim (DE); Hans Steinbichler, Neubeuern (DE); Marcus Steinbichler, Neubeuern (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 0 days.

(21) Appl. No.: 11/219,279

(22) Filed: Sep. 2, 2005

(65) Prior Publication Data
US 2006/0083347 A1  Apr. 20, 2006

(30) Foreign Application Priority Data
Oct. 15, 2004  (DE) .................. 10 2004 050 355

(51) Int. Cl.
*G01M 17/02* (2006.01)

(52) U.S. Cl. .......................................... 73/146; 378/61
(58) Field of Classification Search .................. 73/146; 378/61; 374/45
See application file for complete search history.

(56) References Cited

U.S. PATENT DOCUMENTS

| | | | |
|---|---|---|---|
| 6,433,874 B2 * | 8/2002 | Lindsay et al. | 356/458 |
| 2001/0021025 A1 * | 9/2001 | Lindsay et al. | 356/458 |
| 2001/0040682 A1 * | 11/2001 | Lindsay et al. | 356/520 |
| 2004/0165180 A1 * | 8/2004 | Voeller et al. | 356/139.09 |

* cited by examiner

*Primary Examiner*—Andre J. Allen
(74) *Attorney, Agent, or Firm*—Carter, Deluca, Farrell & Schmidt, LLP

(57) ABSTRACT

An apparatus for the inspection of the surface (1) of a tire (2) or the like comprises a projector (3) for the projection of a pattern onto the tire (2) and a camera (4) for the taking of an image of the pattern projected onto the tire. A simplified apparatus of this type comprises an apparatus for the rotation of the tire (2) about its axis (5).

14 Claims, 2 Drawing Sheets

Figure 1:
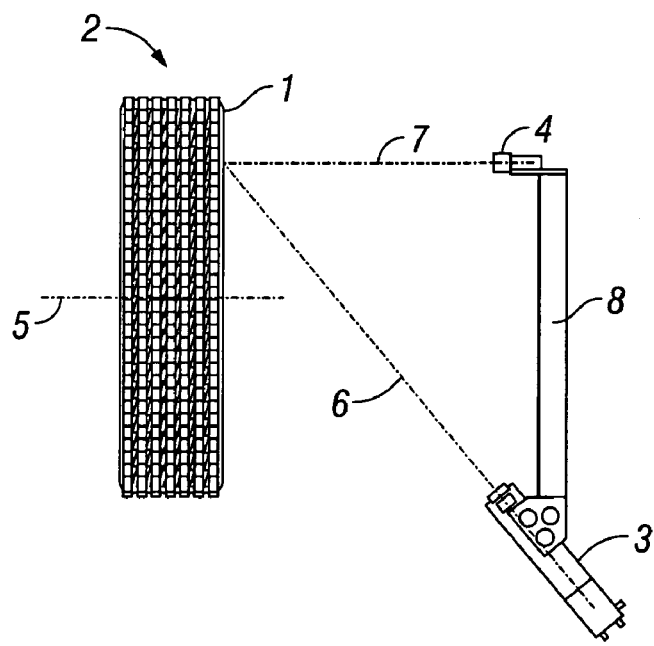

— Tire amplitude Image 1
-- Tire amplitude Image 2
---- Difference amplitude

METHOD AND AN APPARATUS FOR THE INSPECTION OF THE SURFACE OF A TIRE

The invention relates to a method for the inspection of the surface of a tire or the like in which a pattern is projected onto the tire and an image is taken of the pattern projected onto the tire. The invention furthermore relates to an apparatus for the inspection of the surface of a tire or the like, in particular to an apparatus to carry out the method for the inspection of the surface of a tire or the like comprising a projector for the projection of a pattern onto the tire and a camera for the taking of an image of the pattern projected onto the tire. The invention is suitable for the inspection of the surface of tires of all types, in particular of passenger car tires, truck tires or tires of other vehicles or aircraft. It is furthermore suitable for the inspection of the surface of other rotationally symmetrical objects.

Defective positions in the substructure of tires represent a substantial safety risk. Since defective positions of this type are not visible from the outside or are only visible from the outside with difficulty, tire manufacturers and tire retreaders are dependent on reliable inspection methods for the recognition of defects of this type.

A known practice consists of carrying out a pressure inspection of the tires at a very elevated tire pressure and to make a tactile examination of the sidewalls of the tires manually. The local strength of the tire changes at defective positions of the sub-structure, whereby the corresponding positions of the side wall stretch more under pressure strain than regions with an intact substructure. Trained personnel can feel the light bulges on the sidewall of the tire which arise in this manner by tactile examination.

This manual determination of the defective positions involves a very high risk of accident for the inspecting personnel, however, since the tires standing under high pressure or very high pressure can burst during the inspection. A further disadvantage is the poor defect detection in regions in which the sidewall is not smooth, for example due to stamped lettering.

Further inspection methods are known in the prior art in which the shape of the tire is measured at different tire pressures. DE 100 19 387 C2 discloses a method for the examination of tires in which the inner pressure of the tire is changed and the shape change of the tire caused by the change in the inner pressure is determined. Those shape deviations caused by the change in pressure can be determined from at least two shape data sets which indicate defective positions in the substructure of the tire. It is, however, necessary to digitize the tire sidewalls with shape detection systems such as stripe projection systems a multiple of times and subsequently to extract the defects from the data sets.

The method known from EP 0 823 623 A1 is based on interferometric shearography. In this method, images, namely shearograms, are taken at different tire pressures. The gradient difference is determined from the different images. However, due to the very high measurement sensitivity of shearography, this method can only be used with low pressure differences. Furthermore, it is also necessary with this method to measure the shape of the tire at different tire pressures.

It is the object of the invention to provide a simplified method and a simplified apparatus of the initially recited type.

In a method of the initially recited type, this object is solved by the features of claim 1. The tire is rotated about its axis, a further image is taken of the pattern projected onto the tire and the images are compared with one another. It is possible in this way to obtain a clear representation of the defects.

A stripe pattern is preferably projected onto the tire.

It is furthermore advantageous to form a difference image from the images.

In an apparatus of the initially recited type, the object underlying the invention is solved by the features of claim 4. The apparatus includes an apparatus for the rotation of the tire about its axis.

Advantageous further developments are described in the dependent claims.

It is advantageous for the projector to be suitable for the projection of a stripe pattern onto the tire.

A further advantageous further development is characterized by an image processing device, which can be formed, for example, by a PC or other computer, to compare two images taken at different position of rotation of the tire. The image processing device preferably forms a difference image from two images taken at different positions of rotation of the tire.

In accordance with a further advantageous further development, the projector comprises a flashlight source. The flashlight source is preferably synchronized with the apparatus for the rotation of the tire and with the camera.

In accordance with a further advantageous further development, the projector projects the pattern onto a partial surface of the tire. It is, however, also possible for the projector to project the pattern onto the total tire area. It is possible that the camera takes images of a partial surface of the tire. This can be the same partial surface onto which the projector projects the pattern. It is, however, also possible for the camera to take images of the total tire surface. In this case, it is advantageous for the projector to project the pattern onto the total tire surface.

In accordance with a further advantageous further development, the apparatus comprises a plurality of projectors and/or a plurality of cameras. It is of particular advantage for the apparatus to respectively comprise at least one projector and at least one camera on two sides of the tire. In this case, both sides of the tire can be inspected simultaneously.

A further advantageous further development is characterized by one or more adjustment devices for the adjustment of the projector or of the projectors and/or of the camera or cameras.

The method in accordance with the invention and the apparatus in accordance with the invention are based on a combination of the obligatory pressure inspection and on the measurement of the sidewall surface or sidewall surfaces at a pressure kept constant. In this process, the global shape of the tire is utilized to obtain a clear representation of the defects. The surface deformations occurring due to pressure strain at defective positions can be determined very fast and simply with the method in accordance with the invention and with the apparatus in accordance with the invention, without having to expose the tire to an additional strain by a change in pressure. Since the tire does not have to be exposed to any pressure change, it is furthermore generally possible to carry out the method faster.

The method in accordance with the invention and the apparatus in accordance with the invention can be used with all rotationally symmetrical bodies on whose surfaces defective positions have to be determined. It can in particular be used with all rotationally symmetrical elastic hollow bodies which are charged with pressure or which can be charged with pressure for the purpose of the inspection. The invention can, however, also be used with any other geometrical bodies in order to identify bulges or indentations or similar defects.

Figure 2:
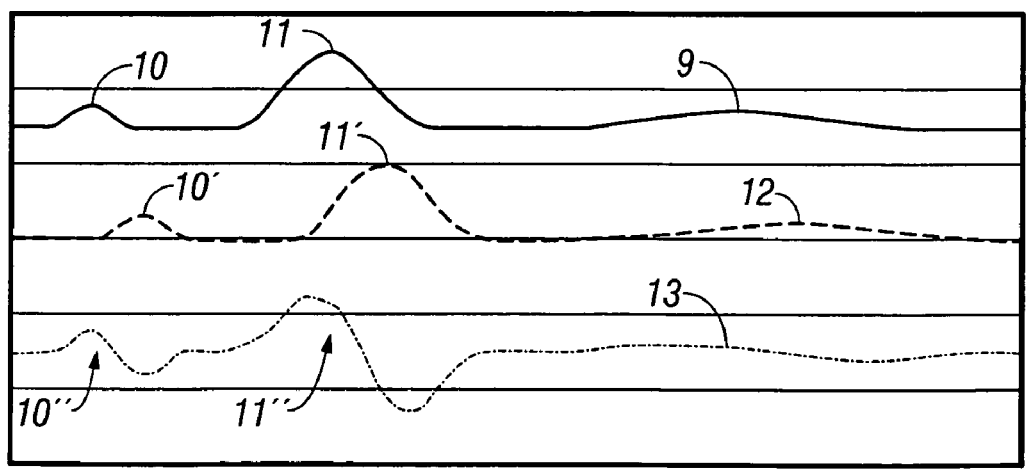
Figure 3:
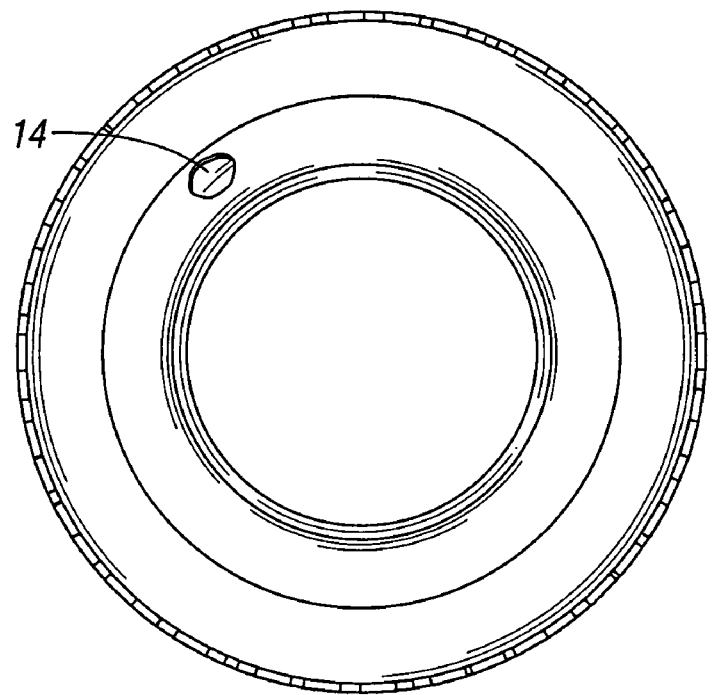

Embodiments of the invention will be explained in detail in the following with reference to the enclosed drawing. There are shown in the drawing:

FIG. 1 an apparatus for the inspection of the surface of a tire in a plan view;

FIG. 2 a schematic representation of different images of the pattern projected onto the tire;

FIG. 3 a comparison image of a tire made up of a plurality of images; and

Figure 4:
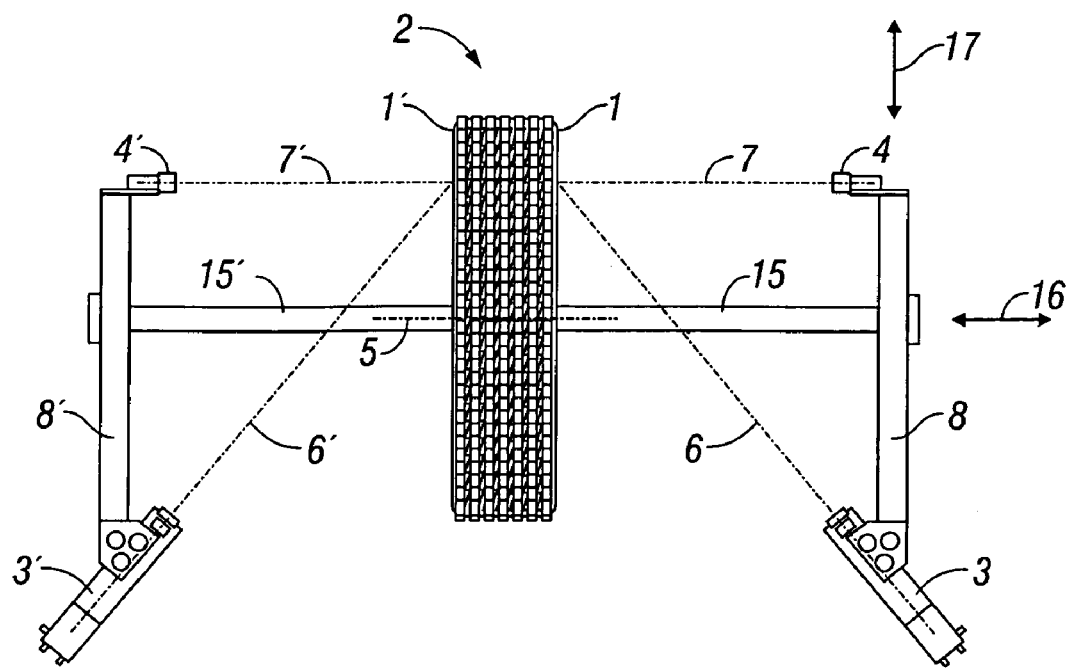

FIG. 4 a modified embodiment of the apparatus shown in FIG. 1.

The apparatus shown schematically in FIG. 1 in a view from above for the inspection of the surface 1, namely the sidewall, of a tire 2 mounted on a rim and standing under pressure includes a projector 3 for the projection of a stripe pattern onto the surface 1 of the tire 2 and a camera 4 which includes an optical taking device and a CCD sensor for the taking of an image of the stripe pattern projected onto the surface 1 of the tire 2. The tire 2 can be rotated about its axis 5, namely its running axis, by a further apparatus (not shown in the drawing). The axis 5 extends in the horizontal direction.

The plane constructed by the projection beam 6 and the taking beam 7 likewise extends horizontally. The axis 5 is a component of this plane. The projector 3 and the camera 4 are mounted at the ends of a rail 8 which is fixed to the housing and which extends in a horizontal plane perpendicular to the axis 5. The taking beam 7 of the camera 4 is incident onto the surface 1 of the tire 2 in a perpendicular manner. The projection beam 6 is incident onto the surface 1 of the tire 2 at an angle of approximately 30 to 45° (other angles are also possible). As can be seen from FIG. 1, the projector 3 only projects a stripe pattern onto a partial surface of the sidewall of the tire 2. The camera 4 takes images of this partial surface.

The apparatus furthermore comprises an image processing device (not shown in the drawing) which is in particular realized by a corresponding program on a PC or other computer. The image processing device compares two images of the camera 4 taken at different positions of rotation of the tire 2, in particular in that it forms a difference image from two images taken at different positions of rotation of the tire 2. This procedure is then repeated for a plurality of positions of rotation of the tire 2 preferably sequential to one another.

The projector 3 is furthermore equipped with a flashlight source (not shown in the drawing) which is synchronized with the camera 4 and the angle of rotation of the tire 2 about the axis 5. In this manner, images can be taken in a very brief time, for example in 1/1000th of a second or even shorter times. The images can be taken when the tire 2 is at a standstill. It is, however, also possible to have the tire 2 rotate continuously about the axis 5. The tire 2 should rotates "slowly" in relation to the shutter time of the camera 4 and/or to the Illumination period of a flash of the flashlight source. The rotational speed of the tire 2 about the axis 5 should therefore be sufficiently low in relation to the exposure time of the camera 4 and/or to the illumination period of a flash of the flashlight source in order to obtain images which can be evaluated.

The apparatus for the inspection of the surface 1 of the tire 2 consists, as shown in FIG. 1, of a stripe projection system which is mounted in a pressure inspection bench and consists of a stripe projector 3 and a camera 4 with connected image processing, with the triangulation plane of the stripe projection system expediently being arranged, as shown, radially to the tire 2. In the embodiment, the arrangement is aligned to a sector of the tire sidewall. It can, however, also be aligned onto the total tire sidewall.

The defect recognition takes place in a manner such that two images of the surface 1 of the tire 2 are taken, with the fire 2 being rotated by a small angle in its axis 5 between the image taking. The relative shape of the surface 1 of the tire 2 is measured with each of the two images in the observed image region (with a suitable calibration of the camera 4 it is also possible to obtain absolute shape data). When the two images taken with a slightly rotated tire are compared, it is found that the global shape is similar in both images since the tire 2 is rotationally symmetrical, but that clear shape deviations result at defect positions.

The pictorial difference of the two images taken thus represents the difference of the relative (or absolute) shape of the surface 1 of the tire 2 and approximately corresponds to the representation of the local shape change known from shearography.

An example is shown in FIG. 2. The upper curve 9 shows a section through the first image. A first amplitude 10 is generated by a first defect position; a second amplitude 11 is generated by a second defect position.

The middle line 12 shows a section through the second image on whose taking the tire 2 was rotated slightly about its axis 5. Accordingly, the amplitudes 10', 11' are displaced slightly to the right with respect to the associated amplitudes 10, 11.

The lower line 13 shows the difference result, with the values of the middle line 12 having been subtracted from the values of the upper line 9. The deflections of the difference amplitudes 10" and 11" are greater than the deflections of the amplitudes 10, 11 and 10', 11'. The defective positions on the surface 1 of the tire 2 can hereby be reliably recognized.

FIG. 3 shows a comparison image taken in this manner, namely a difference image, of the sidewall of a tire. The defect position 14 is clearly visible and undoubtedly recognizable. It corresponds to a bulge or to an indentation.

The difference image representation in accordance with FIG. 3 can still be evaluated quantitatively by a suitable image processing and/or be stored as an inspection record. The sensitivity of the measurement process can be set in a simple manner by a change of the angle of rotation of the tire between the taking of the images.

For the simultaneous measurement of both sidewalls of the tire 2, a plurality of projectors and cameras can also be used, in particular two projectors and cameras disposed opposite one another. An embodiment is shown in FIG. 4. The arrangement is symmetrical to the tire 2. In addition to the components already present in the embodiment in accordance with FIG. 1, namely the projector 3 and the camera 4, a further projector 3' and a further camera 4' are present on the other side of the tire 2 by which the oppositely disposed surface 1', that is the other side wall, of the tire 2 is inspected. Since the setup is symmetrical, it does not have to be described again in detail.

In the embodiment in accordance with FIG. 4, the projectors 3, 3' and the cameras 4, 4' are each adjustable. The adjustability of the projector 3 and of the camera 4 is described in the following. The projector 3' and the camera 4' are adjustable in a corresponding manner.

The rail 8 is fastened approximately at its center to a feed axle 15. The rail can be displaced in the direction of the double arrow 16, that is in the direction of the axis 5, by an actuation of the feed axle 15. An adjustment in this direction serves the adaptation of the projector 3 and of the camera 4 to different tire widths. The projector 3 and the camera 4 are moved so far along the feed axle 15 in the direction of the double arrow 16 until the surface 1 of the tire is focused.

The rail 8 can furthermore be fed in the direction of the double arrow 17. As the rail 8 moves, the projector 3 fixedly mounted thereon and the camera 4 fixedly mounted thereon move. By a feed in the direction of the double arrow 17, that is in a horizontal plane in a direction perpendicular to the axis 5, the position of the projector 3 and the camera 4 can be adapted to different tire diameters.

Instead of the feed possibility in the direction of the double arrow 17, a feed possibility in a direction perpendicular to the image plane can also be realized.

The invention claimed is:

1. A method for the inspection of the surface (1) of a tire (2) comprising projecting a pattern onto the tire (2); taking an image of the pattern projected onto the tire (2) to form a first image of the pattern on the tire;

rotating the tire (2) about its axis (5); taking a further image of the pattern projected onto the rotated tire (2) to form an image of the pattern on the rotated tire; and comparing the first and further images with one another.

2. A method in accordance with claim 1, wherein the pattern projected onto the tire (2) is a stripe pattern.

3. A method in accordance with claim 1, wherein a difference image is formed from the images.

4. An apparatus for the inspection of the surface (1) of a tire (2) comprising a projector (3, 3') for the projection of a pattern onto the tire (2) and a camera (4, 4') for the taking of an image of the pattern projected onto the tire (2), and an apparatus for the rotation of the tire (2) about its axis (5).

5. An apparatus in accordance with claim 4, wherein the pattern projected onto the tire (2) is a stripe pattern.

6. An apparatus in accordance with claim 4, characterized by an image processing device for the comparison of two images taken at different positions or rotations of the tire (2).

7. An apparatus in accordance with claim 6, wherein the image processing device forms a difference image from two images taken at different positions of rotation of the tire (2).

8. An apparatus in accordance with claim 4, wherein the projector (3, 3') comprises a flashlight source.

9. An apparatus in accordance with claim 8, wherein the flashlight source is synchronized with the apparatus for the rotation of the tire (2) and with the camera (4, 4').

10. An apparatus in accordance with claim 4, wherein the projector (3, 3') projects the pattern onto a partial surface of the tire (2).

11. An apparatus in accordance with claim 4, wherein the projector projects the pattern onto the total tire surface.

12. An apparatus in accordance with with claim 4, wherein the apparatus comprises a plurality of projectors (3, 3') and/or a plurality of cameras (4, 4').

13. An apparatus in accordance with claim 12, wherein the apparatus respectively comprises at least one projector (3, 3') and at least one camera (4, 4') on two sides of the tire (2).

14. An apparatus in accordance with claim 4, characterized by one or more adjustment devices (15, 17) for the adjustment of the projector (3, 3') and/or of the camera (4, 4').

* * * * *